Sept. 13, 1932.  T. W. PAUL  1,877,578
MOWER
Filed Aug. 18, 1930
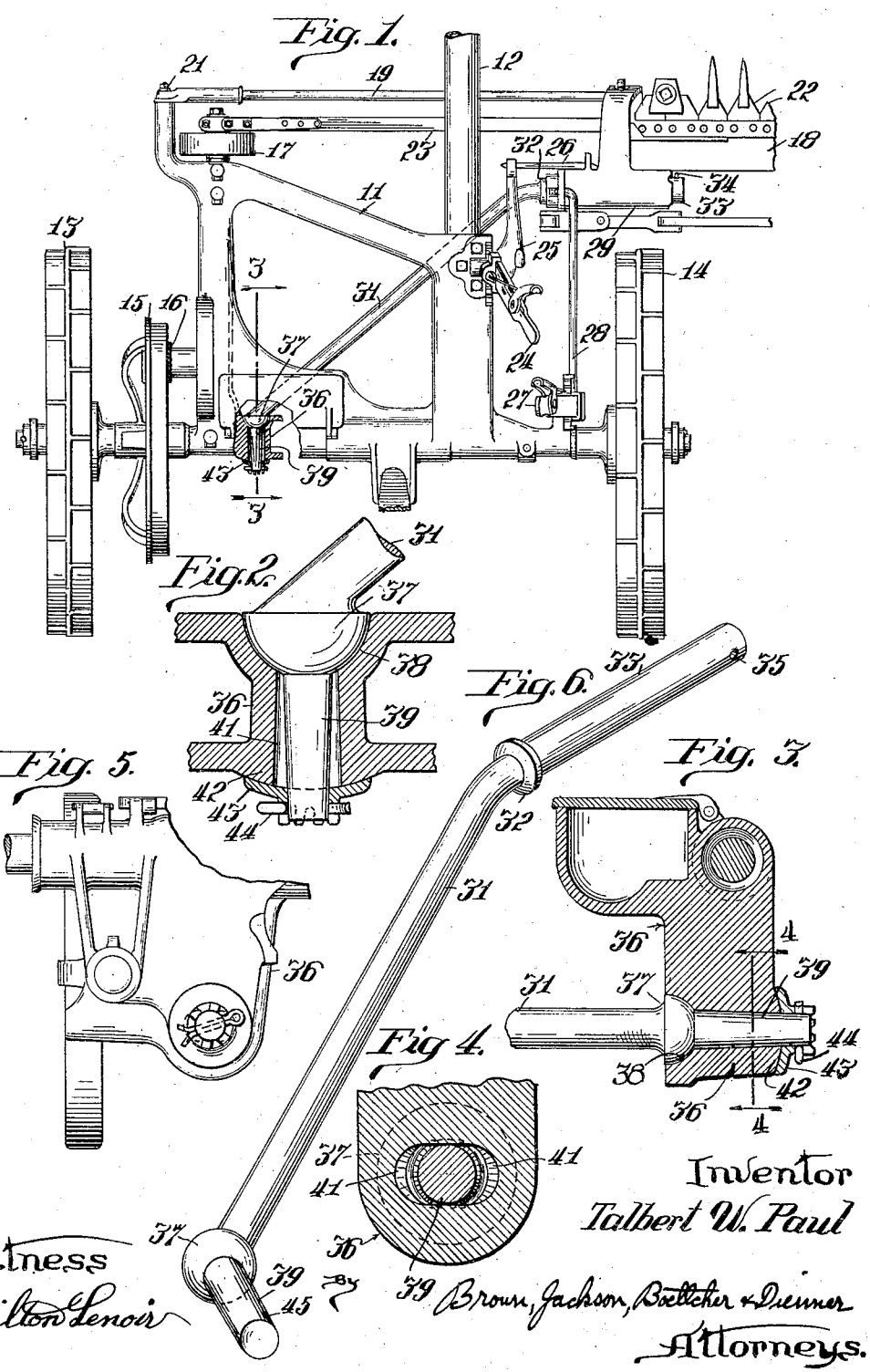
Inventor
Talbert W. Paul
By Brown, Jackson, Boettcher & Dienner
Attorneys.
Witness
Milton Lenoir Patented Sept. 13, 1932

1,877,578

UNITED STATES PATENT OFFICE

TALBERT W. PAUL, OF MOLINE, ILLINOIS, ASSIGNOR TO DEERE & COMPANY, OF MOLINE, ILLINOIS, A CORPORATION OF ILLINOIS

MOWER

Application filed August 18, 1930. Serial No. 475,893.

This invention relates to mowers and more particularly to a thrust rod connection for the cutter bar of a mower and frame whereby wear usually resulting at the frame connection due to lifting and tilting movement of the cutter bar usually tending to throw the knife out of registration with the ledger plates of the guard fingers on the cutter bar is eliminated.

Heretofore, it has been the practice to provide between a mower frame and a cutter bar associated therewith for lifting and tilting movement, a thrust rod having pivotal connection with the cutter bar and a similar near pivotal connection with the frame. Due to the usual wear at the frame connection incident to lifting and tilting movement of the cutter bar, the wear at this point of connection soon throws the cutting knife out of registration with the usual ledger plates of the guard fingers supported on the cutter bar. To partially eliminate this detrimental effect, it has been heretofore customary to provide means at the point of connection between the thrust rod and the cutter bar at the front end of the thrust rod for correcting the registration between the knife and ledger plates of the guard fingers as wear occurs at the point of connection of the thrust rod with the frame at the rear end of the thrust rod. While such an arrangement has been effective to a certain degree, it has been found that this arrangement is only effective to a certain degree of wear and beyond such degree, such means has been ineffective.

The present invention contemplates the elimination of the detrimental wear factor by the provision of a novel connection of the thrust rod with the frame. This is accomplished, more specifically, by the provision of a semi-spherical socket in the mower frame at the point of connection of the thrust rod with the frame and providing the thrust rod at this point with a semi-spherical enlargement cooperating with the socket. A laterally enlarged passage converging toward the rear of the frame, communicates with the socket and accommodates a considerably tapered, frusto-conical extension provided substantially centrally of the enlargement on the thrust rod. The outer side of the frame surrounding the adjacent outer end of the passage, is provided with an enlargement formed on a larger radius than the enlargement on the thrust rod employing the center of the enlargement on the thrust rod as a center. A suitable adjustable washer or the like conforming to the shape of the enlargement on the frame and adjustably secured to the end of the frusto-conical extension on the thrust rod, cooperates with the enlargement on the frame to retain the rear end of the thrust rod in cooperative relation with the socket. Due to the considerably enlarged bearing surface provided between the socket and the enlargement on the thrust rod and inasmuch as the extension may have lateral movement in the passage, the wear incident to lifting and tilting of the cutter bar is materially reduced at this point. Any wear which might result at this point may be readily taken up by adjustment of the washer associated with the extreme end of the extension on the thrust rod.

Other and further features of importance and advantage will appear from the following detailed description of a preferred embodiment of the invention illustrated in the accompanying drawing, in which:

Figure 1 is a fragmentary plan view of a mower incorporating the features of the present invention, such features being shown in section;

Figure 2 is an enlarged sectional view similar to the section shown in Figure 1;

Figure 3 is a section taken along the line 3—3 of Figure 1;

Figure 4 is a section taken along the line 4—4 of Figure 3;

Figure 5 is a fragmentary elevation of the rear of the mower frame illustrating that portion thereof at the point of connection of the thrust rod therewith; and Figure 6 is a perspective view of the thrust rod embodying the salient features of the present invention.

Referring more particularly to Figure 1, I have fragmentarily illustrated a mower comprising a frame 11 having a draft member 12 extending forwardly therefrom and carried upon suitable traction wheels 13 and 14. The traction wheel 13 has suitably associated therewith an internal drive gear 15 meshing with a suitable drive pinion 16 transmitting power through suitable connections to a fly wheel 17 positioned at the forward portion of the frame 11. A cutter bar 18 has pivotal connection with a tie rod 19 which in turn has pivotal connection with the forward end of the frame 11 at 21. Cutter bar 18 supports a knife 22 for reciprocatory movement, the knife 22 being suitably connected to fly wheel 17 by means of a rod 23. A lever 24 suitably supported upon the frame 11 for convenient accessibility to an operator, is suitably connected by means of a lever or crank arm 25 and link 26 to the cutter bar 18 for imparting lifting movement to the cutter bar. A second lever 27 is also suitably pivoted to the frame 11 at a point of convenient accessibility to the operator, and is suitably connected by means of a link 28 to a cutter bar supporting casting 29 to impart tilting movement to the cutter bar.

A thrust rod 31 provided with a collar 32 adjacent the forward end thereof has a journal portion 33 suitably supported for rotary movement within the casting 29 and is retained in such casting by a pin 34 passed through a suitable hole 35. The body portion of the thrust rod 31 extends diagonally rearwardly from the casting 29 to the rear transverse portion 36 of the frame 11 and is provided adjacent its rear end with a semispherical enlargement 37. This enlargement 37 seats in a component socket 38 provided in the forward side of the transverse portion 36 of frame 11. Centrally of the semispherical enlargement 37 and extending rearwardly therefrom, is an extension 39 tapering rearwardly and generally of frustoconical configuration, the rearmost end thereof protruding beyond the rear side of the transverse portion 36 of the frame 11. This extension 39 is accommodated in a laterally enlarged passage 41 converging rearwardly in a vertical plane and diverging slightly laterally in the horizontal plane. The convergence rearwardly in the vertical plane, i. e., the rearwardly converging taper of the top and bottom walls of the passageway or opening 41, is such as to correspond substantially to the degree of taper of the extension 39. The lateral divergence of the side walls of said opening accommodates limited oscillation of the thrust rod 31 in a horizontal plane. The rear side of the transverse portion 36 of the frame 11 surrounding the rear end of the passage 41 is formed with an enlargement 42 formed upon a larger radius than the rod enlargement 37 but upon the same center as the spherical enlargement 37 or socket 38. A castellated washer 43 is fitted over the end of the extension 39 and has a flange portion conforming to the outer surface of the enlargement 42. The pairs of opposite slots or recesses in the castellated portion of the washer are made of slightly different depths as shown in dotted lines in Figure 2. Washer 43 is retained in position on the extension shank 39 by means of a suitable cotter pin 44 passed through a pair of these opposite slots and through a hole 45 provided in the extension 39 adjacent the end thereof. By removing this cotter pin and turning the washer to bring other pairs of slots of different depths into alignment with hole 45 the washer can be adjusted inwardly or outwardly for obtaining a different fit or to take up wear.

It will be readily apparent that the connection provided between the thrust rod 31 and the rear transverse portion 36 of the frame 11 permits a free turning of the thrust bar 31 as the cutter bar is raised or lowered by means of the lifting lever 24 at which time a slight amount of movement of the extension 39 in the horizontal plane takes place. Substantially the same combination of movements likewise takes place when the cutter bar 18 is tilted by means of the tilting lever 27.

It will be readily apparent that due to the comparatively large contacting areas between the enlargement 37 on the thrust rod 31 and the socket 38, and between the enlargement 42 and the spherical inner surface of the washer 43, wear between these parts is considerably reduced and such wear as will take place will be uniform over such areas.

While I have illustrated a preferred embodiment of my invention, I do not wish to be limited thereto. As will be understood by those skilled in the art, certain changes may be made therein without departing from the essence of the invention or the spirit and scope of the appended claims.

What I claim and desire to secure by Letters Patent is:

1. In combination in a mower, a supporting frame member, a cutter member associated with said frame member for lifting and tilting movement, a thrust rod having pivotal connection with one of said members, a socket in the other of said members, a passage through the said other member communicating with said socket, an enlargement on said rod cooperating with said socket of said other member, and an extension on said rod beyond said enlargement cooperating with said passage.

2. In combination in a mower, a supporting frame member a cutter member associated with said frame member for lifting and tilting movement, a thrust rod having pivotal connection with one of said members, a socket in the other of said members, a laterally elongated divergent passage in said other member communicating with said socket, an enlargement on said rod cooperating with said socket, and an extension on said rod beyond said enlargement cooperating with said passage.

3. In combination in a mower, a supporting frame member, a cutter member associated with said frame member for lifting and tilting movement, a thrust rod having pivotal connection with one of said members, a socket in the other of said members, a laterally elongated divergent passage in said other member communicating with said socket, an enlargement on said rod cooperating with said socket and an extension on said rod beyond said enlargement cooperating with said passage, said extension being adapted to have rotary and lateral movement in said passage and being precluded from transverse movement with respect to said passage.

4. In combination in a mower, a frame, a cutter bar associated with said frame for lifting and tilting movement, a thrust rod pivotally connected with said cutter bar, a socket in said frame a passage through the frame communicating with said socket, an enlargement on said rod cooperating with said socket, and an extension on said rod cooperating with said passage.

5. In combination in a mower, a frame, a cutter bar associated with said frame for lifting and tilting movement, a thrust rod pivotally connected with said cutter bar, a socket in said frame, a laterally elongated divergent passage through said frame communicating with socket, an enlargement on said rod cooperating with said socket, and an extension on said rod cooperating with said passage.

6. In combination in a mower, a frame, a cutter bar associated with said frame for lifting and tilting movement, a thrust rod pivotally connected with said cutter bar, a socket in said frame, a laterally elongated divergent passage through said frame communicating with said socket, an enlargement on said rod cooperating with said socket, and an extension on said rod cooperating with said passage, said extension being adapted to have rotary and lateral movement in said passage and being precluded from transverse movement with respect to said passage.

7. In combination in a mower, a frame, a cutter bar associated with said frame for lifting and tilting movement, a thrust rod pivotally connected with said cutter bar, a socket in said frame, a passage through the frame communicating with said socket, an enlargement on said rod cooperating with said socket, an extension on said enlargement cooperating with said passage and extending through to the outer side of said frame, and means cooperating with the outer side of said frame and said extension to retain said extension in said passage.

8. In combination in a mower, a frame, a cutter bar associated with said frame for lifting and tilting movement, a thrust rod pivotally connected with said cutter bar, a socket in said frame, a passage through the frame communicating with said socket, an enlargement on said rod cooperating with said socket, an extension on said enlargement cooperating with said passage and extending beyond said frame, an enlargement on said frame adjacent said passage, and means associated with said extension and cooperating with said frame enlargement for retaining said extension in said passage and said rod enlargement in said socket.

9. In combination in a mower, a frame, a cutter bar associated with said frame for lifting and tilting movement, a thrust rod pivotally connected with said cutter bar, a socket in said frame, a passage through the frame communicating with said socket, an enlargement on said rod cooperating with said socket, an extension on said enlargement cooperating with said passage and extending through to the outer side of said frame, and adjustable means cooperating with the outer side of said frame and said extension to retain said extension in said passage.

10. In combination in a mower, a frame, a cutter bar associated with said frame for lifting and tilting movement, a thrust rod pivotally connected with said cutter bar, a socket in said frame, a passage through the frame communicating with said socket, an enlargement on said rod cooperating with said socket, an extension on said enlargement cooperating with said passage and extending beyond said frame, an enlargement on said frame adjacent said passage, and adjustable means associated with said extension and cooperating with said frame enlargement for retaining said extension in said passage and said rod enlargement in said socket.

11. In combination in a mower, a frame, a cutter bar associated with said frame for lifting and tilting movement, a thrust rod pivotally connected with said cutter bar, a semi-spherical socket in said frame, a passage through the frame communicating with said socket, an enlargement on said rod cooperating with said socket, an extension on said enlargement cooperating with said passage and extending beyond said frame, an enlargement on said frame surrounding the outer end of said passage and formed with the center of said socket as a center, and means associated with said extension and cooperating with said frame enlargement for retaining said extension in said passage and said rod enlargement in said socket.

12. In combination in a mower, a frame, a cutter bar associated with said frame for lifting and tilting movement, a thrust rod pivotally connected with said cutter bar, a semi-spherical socket in said frame, a passage through the frame communicating with said socket, an enlargement on said rod cooperating with said socket, an extension on said enlargement cooperating with said passage and extending beyond said frame, an enlargement on said frame surrounding the outer end of said passage and formed with the center of said socket as a center, and means associated with said extension and cooperating with said frame enlargement for retaining said extension in said passage and said rod enlargement in said socket, said means being adjustable concentrically with respect to the axis of said extension to take up wear between said rod enlargement and said socket.

13. In combination in a mower, a supporting frame member, a cutter member associated with said frame member for lifting and tilting movement, a thrust rod having pivotal connection with one of said members, a socket in the other of said members, a divergent passage in said other member communicating with said socket, an enlargement on said rod cooperating with said socket, and an extension on said rod beyond said enlargement cooperating with said passage.

14. In combination in a mower, a frame, a cutter bar associated with said frame for lifting and tilting movement, a thrust member connected with said cutter bar and having an enlargement with an extension projecting therefrom, a socket in the frame to receive said enlargement, and a passage through the frame larger than said extension to loosely receive the latter and to provide for limited relative movement thereof.

15. In combination in a mower, a frame, a cutter bar associated with said frame for lifting and tilting movement, a thrust member connected with said cutter bar and having an enlargement with an extension projecting therefrom, a socket in the frame to receive said enlargement, a passage through the frame larger than said extension to loosely receive the latter and to provide for limited relative movement thereof, and means on said extension to retain the enlargement in said socket.

16. In combination in a mower, a frame, a cutter bar associated with said frame for lifting and tilting movement, a thrust rod connected with said cutter bar, means spaced fore and aft on said frame and providing a forward socket and a rear opening, an enlargement on said rod cooperating with said socket, and an extension on said rod cooperating within the opening of said means.

17. In combination in a mower, a frame, a cutter bar associated with said frame for lifting and tilting movement, a thrust rod connected with said cutter bar, lug means extending downwardly from said frame and positioned fore and aft thereof, said lug means having a socket in one portion thereof and an opening in fore and aft alinemet with said socket, an enlargement on said rod cooperating with said socket, and said rod having a portion thereof cooperating within the opening in said lug means.

18. In combination in a mower, a frame, a cutter bar associated with said frame for lifting and tilting movement, a thrust rod connected with said cutter bar, means including portions spaced fore and aft on said frame, an enlargement on said rod cooperating with one of said portions, and an extension on said rod cooperating with the other of said portions.

In witness whereof, I hereunto subscribe my name this 13th day of August, 1930.

TALBERT W. PAUL.